United States Patent
Song et al.

(10) Patent No.: US 9,956,529 B2
(45) Date of Patent: May 1, 2018

(54) MICROFABRICATED ION-SELECTIVE FILTER FOR FILTRATION OF IONS AND MOLECULES

(71) Applicant: New York University, New York, NY (US)

(72) Inventors: Yong Ak Song, Abu Dhabi (AE); Supatra Yee Ping Lee, Abu Dhabi (AE); Nour Ashraf El Sayed Shabaka, Abu Dhabi (AE); Brian Kamau Ndirangu, Abu Dhabi (AE)

(73) Assignee: NEW YORK UNIVERSITY, New York, NY (US)

( * ) Notice: Subject to any disclaimer, the term of this patent is extended or adjusted under 35 U.S.C. 154(b) by 469 days.

(21) Appl. No.: 14/676,655

(22) Filed: Apr. 1, 2015

(65) Prior Publication Data
US 2015/0283512 A1    Oct. 8, 2015

Related U.S. Application Data

(60) Provisional application No. 61/974,869, filed on Apr. 3, 2014.

(51) Int. Cl.
*C02F 1/44* (2006.01)
*C02F 1/46* (2006.01)
(Continued)

(52) U.S. Cl.
CPC ......... *B01D 61/425* (2013.01); *B01D 61/427* (2013.01); *B01D 63/08* (2013.01);
(Continued)

(58) Field of Classification Search
CPC ...... B01D 61/425; B01D 61/44; B01D 61/46; B01D 61/52; B01D 61/54; B01D 67/00; B01D 67/0023; B01D 67/0032; B01D 67/0034; B01D 67/0039; B01D 67/0053; B01D 67/0055; B01D 67/0062; B01D 69/02; B01D 69/06; B01D 69/10; B01D 69/105; B01D 69/12; B01D 69/122; B01D 2323/28; B01D 2323/30; B01D 2323/42; B01D 2325/02; B01D 2325/028; B01D 2325/26; B01D 2325/42; B01D 2311/20; B01D 2311/2603; B01D 2311/2623; B01D 2311/2684; B01D 71/02; B01D 71/027; B01D 71/024; B01D 61/027; B01D 61/147; B01D 61/42; B01D 61/427; B01D 63/08; B01D 63/081; B01D 63/088; B01D 2311/2626; C02F 1/44; C02F 1/46;
(Continued)

(56) References Cited

U.S. PATENT DOCUMENTS 5,651,900 A * 7/1997 Keller ............... B01D 39/1692
                                                        210/490
5,757,482 A * 5/1998 Fuchs .................. G01N 21/05
                                                        356/246

(Continued)

*Primary Examiner* — Joseph Drodge
(74) *Attorney, Agent, or Firm* — Foley & Lardner LLP

(57) ABSTRACT

A microfabricated filtration membrane including a substrate containing a plurality of micropores, an ion-selective layer, and at least two conductive layers configured to apply a voltage across the micropores. The geometry of the conductive layers matches the geometry of the micropores (or nanopores).

20 Claims, 9 Drawing Sheets

(51) Int. Cl.
　　　*B01D 61/42*　　(2006.01)
　　　*B01D 63/08*　　(2006.01)
　　　*B01D 69/12*　　(2006.01)
　　　*C02F 1/469*　　(2006.01)
　　　*B01D 67/00*　　(2006.01)
　　　*B01D 69/02*　　(2006.01)
　　　*B01D 69/10*　　(2006.01)
　　　*C02F 103/08*　 (2006.01)

(52) U.S. Cl.
　　　CPC ......... *B01D 67/0034* (2013.01); *B01D 69/02* (2013.01); *B01D 69/10* (2013.01); *B01D 69/12* (2013.01); *C02F 1/44* (2013.01); *C02F 1/469* (2013.01); *B01D 2313/345* (2013.01); *B01D 2323/28* (2013.01); *B01D 2325/26* (2013.01); *C02F 2103/08* (2013.01); *Y10T 156/1057* (2015.01)

(58) Field of Classification Search
　　　CPC ...... C02F 1/469; C02F 1/4693; C02F 1/4698; C02F 1/48; C02F 2201/46115; C02F 1/468; C23C 14/34; C23C 14/54; C23C 14/5813
　　　USPC ...... 210/243, 321.6, 321.75, 321.84, 500.22, 210/500.25, 650, 651, 748.01, 500.26; 204/520, 521, 535, 630, 637, 638, 639; 216/56; 427/244, 245, 532, 554
　　　See application file for complete search history.

(56) References Cited

U.S. PATENT DOCUMENTS

| 5,830,340 | A  | * | 11/1998 | Iljitch ................ B01D 39/2031 204/471 |
| 5,938,923 | A  | * | 8/1999  | Tu ....................... B01D 39/2072 210/490 |
| 6,444,474 | B1 | * | 9/2002  | Thomas ............. G01N 33/1846 422/504 |
| 7,214,301 | B2 | * | 5/2007  | Thorstensen ........ B01D 61/445 204/520 |
| 7,442,303 | B2 | * | 10/2008 | Jacobson ............. B01D 63/16 210/500.22 |
| 2010/0326914 | A1 | * | 12/2010 | Drost ................... B01D 63/082 210/644 |
| 2011/0132772 | A1 | * | 6/2011  | Hendriksen ........ B01D 67/0046 205/763 |
| 2014/0042095 | A1 | * | 2/2014  | Unnikrishnan .... B01D 67/0062 210/650 |
| 2016/0229720 | A1 | * | 8/2016  | Schultz ................ B01D 63/005 |

\* cited by examiner

MICROFABRICATED ION-SELECTIVE FILTER FOR FILTRATION OF IONS AND MOLECULES

CROSS-REFERENCE TO RELATED APPLICATIONS

This application claims priority to U.S. Provisional Application No. 61/974,869, filed Apr. 3, 2014, reference of which is hereby incorporated in its entirety.

FIELD OF THE INVENTION

The present invention generally relates to a membrane for high-throughput separation of particles, molecules and ions based on charge.

BACKGROUND

Water has become a precious natural resource in the world and approximately 1.2 billion people lack access to safe drinking water. Millions of people die annually—3,900 children a day—from diseases transmitted through unsafe water or human excreta. Sea water accounts for 97.5% of all water on the Earth. So, capturing a small fraction could have a huge impact on water scarcity. However, sea water desalination requires an expensive and energy-intensive process and involves large-scale facilities. Pre-existing desalination technologies are based on membrane separation via reverse osmosis (RO) and thermal distillation, with RO accounting for over 50% of the installed capacity. Conventional thermal desalination processes are inefficient in their use of energy and suffer particularly from corrosion, as well as scaling that also affects RO. Recent research on the transport of water through hydrophobic double-walled carbon nanotubes is promising, demonstrating water fluxes that are over three orders of magnitude higher than those predicted from continuum hydrodynamic models (Holt et al., Science, 2006, 312 (5776), pp. 1034-1037). However, integrating carbon nanotubes into the membrane remains challenging.

A recently developed desalination method based on ion concentration polarization (ICP) offers an interesting alternative to the membrane-based approach to desalination. This approach minimizes membrane fouling by using an energy barrier as a salt ion filter and can be more energy-efficient than the traditional RO. Kim et al. (Nature Nanotechnology 5, 297-301, 2010) have demonstrated this technology inside a microfluidic chip. However, this microfluidic approach does not have a sufficient throughput (~10 µL/min) and has not been scaled up. For this reason, a large-scale device based on ICP has not previously been demonstrated.

SUMMARY

One implementation relates to a filtration membrane. The filtration membrane includes a substrate including a plurality of micropores or nanopores, an ion-selective layer, and at least two conductive layers. The conductive layers are configured to apply a voltage across the micropores. The geometry of the conductive layers matches the geometry of the micropores or nanopores.

Another implementation relates to a filtration apparatus. The filtration apparatus includes a housing and a filtration membrane. The filtration membrane includes a substrate including a plurality of micropores (or nanopores), an ion-selective layer, and at least two conductive layers. The conductive layers are configured to apply a voltage across the micropores (or nanopores). The geometry of the conductive layers matches the geometry of the micropores (or nanopores).

Another implementation relates to a microfabrication process for the production of a filtration membrane. The process includes disposing an ion-selective layer on a substrate, disposing a first conductive layer over a first side of the substrate, and disposing a second conductive layer over a second side of the substrate. The substrate includes a plurality of micropores (or nanopores).

Another implementation relates to a micromachining process for the production of a filtration membrane. The process includes laminating an ion-selective layer between a first substrate and a second substrate, disposing a first conductive layer over a first side of the laminated structure, disposing a second conductive layer over a second side of the laminated structure, and forming a plurality of micropores throughout the entirety of the laminated structure and conductive layers.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 8A shows the microhole pattern voltage with florescent signaling; FIG. 8B shows the same microhole pattern but with voltage applied, showing no florescence signal in a portion where ion depletion has occurred.

DETAILED DESCRIPTION OF THE PREFERRED EMBODIMENTS

Figure 1:
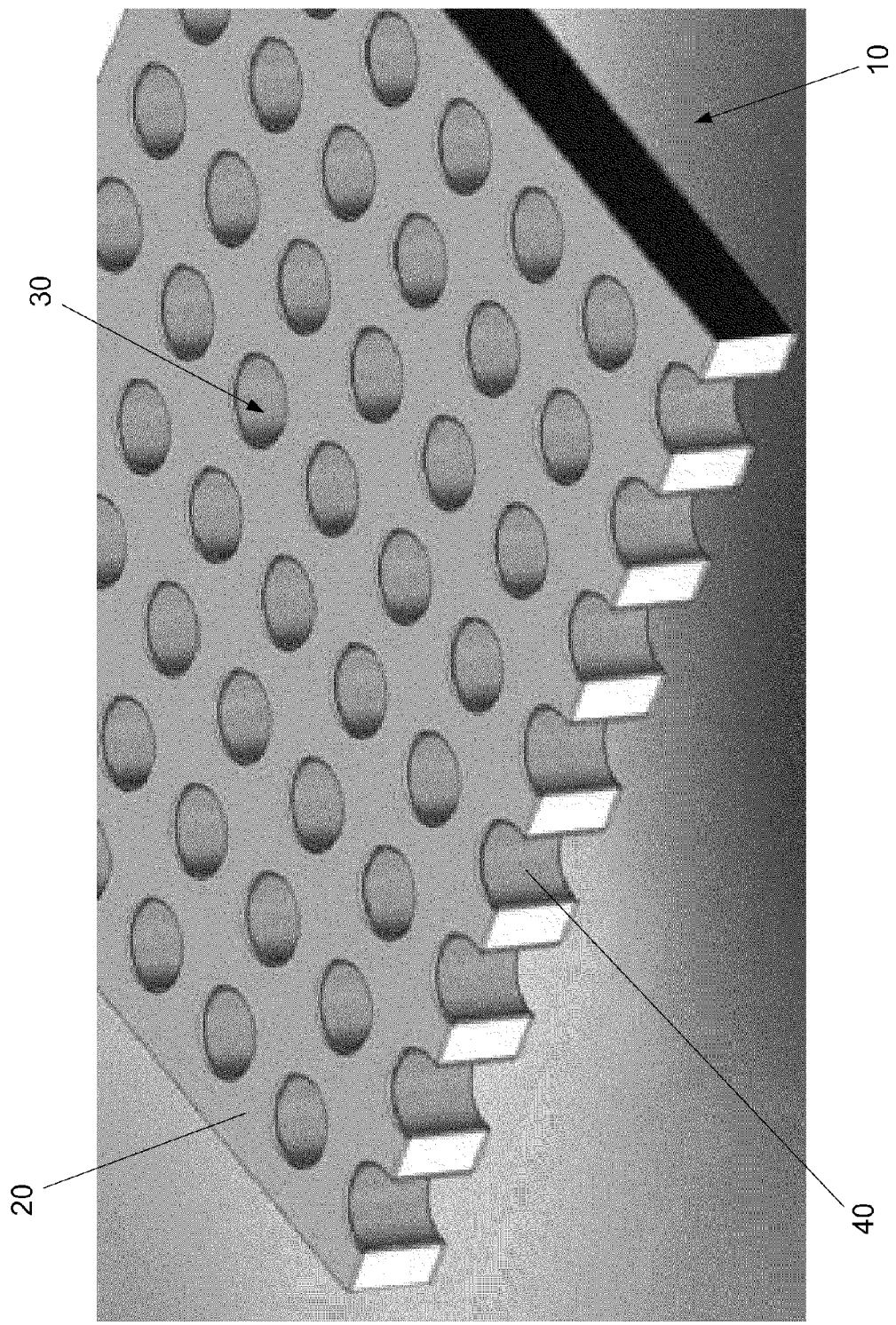
FIG. 1 shows the structure of a filtration membrane according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In some implementations, a microfabricated ion-selective membrane filter that can easily be scaled up to achieve a high-throughput filtration and desalination is provided. The filter can be fabricated by microfabrication as well by micromachining technologies. This filter can also be used for purification of proteins and other biomolecules in life science applications.

The underlying mechanism for the filtration membrane is the phenomena of ion concentration polarization (ICP). This is one of the fundamental electrochemical transport phenomena that has been observed at nanoporous membranes. Nanoporous membranes with non-engineered pores can exhibit perm-selectivity (conducting one species of ions preferentially over the other) when its dimension becomes comparable with the thickness of electrical double layer (EDL). An EDL typically has a thickness on the order of a few nanometers under uniform surface charge distributions and electrolyte concentration of physiological buffers. In these nanoporous structures, EDL can overlap under moderate electrolyte concentration, where only counter-ions (to the nanopore's surface charges) can preferentially transport through the nanopores. Similar phenomenon can also be found in the charge transfer process across ion exchange membranes such as Nafion®, a widely used ion-selective membrane material with strong negatively charged sulfonic groups for fuel cells.

The ICP phenomenon may be employed to concentrate molecules for enhanced immunodetection and also for sea water desalination. The limit of the flow rate for pre-existing devices is typically in the range of about 10 μL/min with a 50% yield. A pre-existing device utilizing an ion-selective membrane formed from stacked mesh layers has demonstrated a throughput of about 1 mL/min.

The filtration membrane may be utilized to remove contaminants from a contaminated fluid. The contaminated fluid may be seawater or contaminated groundwater. According to one implementation, the salinity of the filtered water can be continuously monitored and this data can be used to control the amount of electric voltage applied to the filter.

As shown in FIG. 1, a filtration membrane 10 according to one implementation may include a parallel and highly-ordered array of pores such as micropores (or nanopores) 30 on a flat substrate. The filtration membrane may be produced utilizing microfabrication techniques. The ion-selective membrane 40 is not integrated in-plane, but is disposed vertically within the micropores 30 (or nanopores). In effect, each micropore (or nanopore) becomes a microfluidic channel. The filtration membrane includes a substrate 50 (shown in FIG. 2) located between conductive layers 20.

Figure 2:
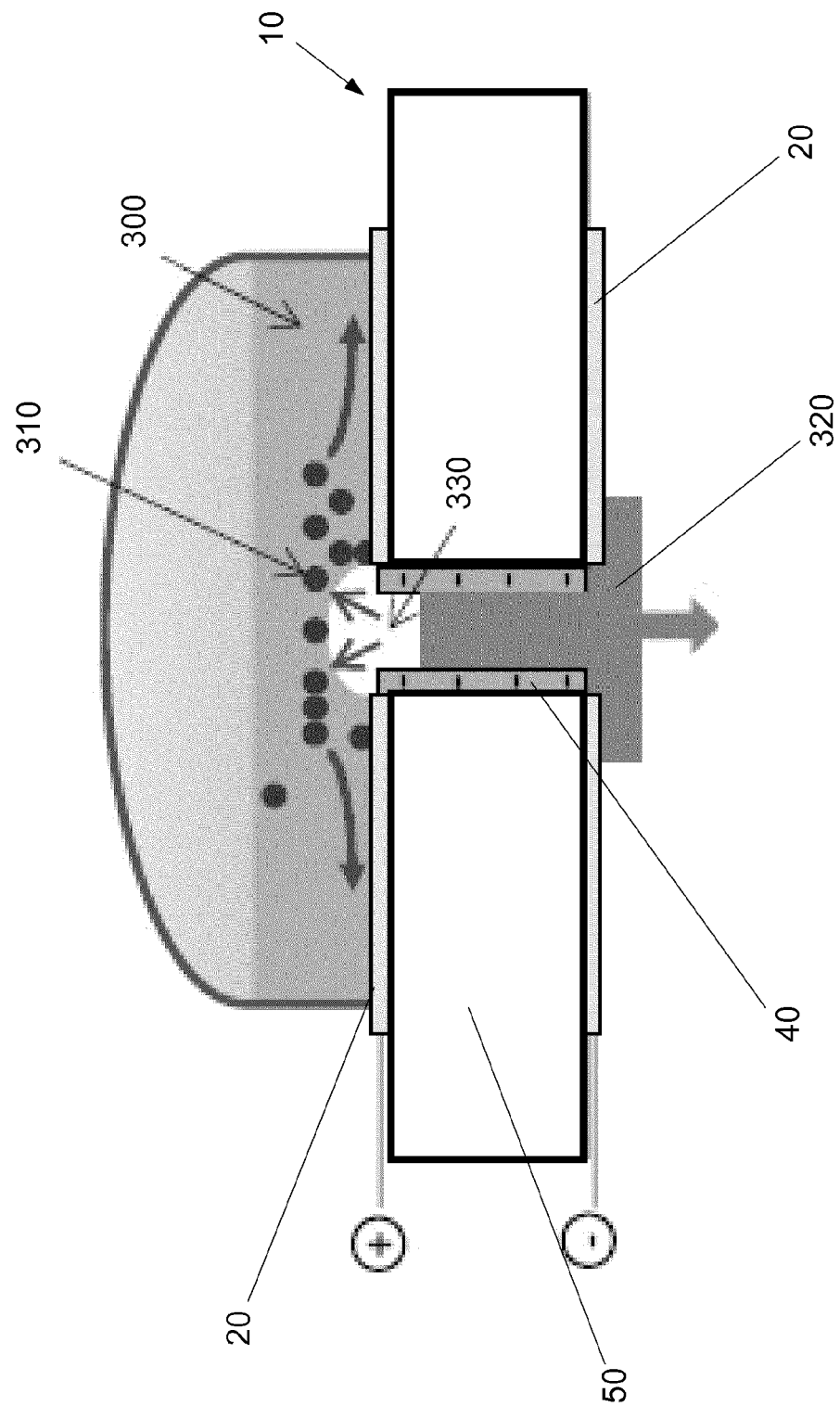
FIG. 2 is a schematic diagram illustrating the operation of the filtration membrane of FIG. 1.

As shown in FIG. 2, when an electric field is applied across the micropores (or nanopores), a depletion region 330 forms directly above each micropore (or nanopore) opening and repels the charged molecules and ions 310. The charged molecules and ions 310 contained in the unfiltered fluid 300 are prevented from entering the micropores 30 (or nanopores) while the neutral molecules and ions pass through the micropores. In this manner, a filtered fluid 320 free of the charged molecules and ions 310 is produced.

The effectiveness of the filtration may depend on the balance between the hydrodynamic force exerted by the unfiltered fluid and the ion depletion force generated by the ion concentration polarization. The hydrodynamic force is determined by the amount of the fluid above the filtration membrane or the external pressure applied to the unfiltered fluid. The ion depletion force depends at least in part on the applied voltage across the micropore (or nanopore) and on the diameter of the pore.

According to one implementation, the size of the micropores in the filtration membrane may be in the range of about 1 μm to about 250 μm. According to another implementation, the micropores may have a size in the range of about 1 μm to about 150 μm. In one embodiment, the micropores have a size of about 100 μm. In one implementation, the pores are less than 250 μm, in a further implementation they are nanopores about 450 nm in size.

According to one implementation, the micropores (or nanopores) may be arranged in any appropriate pattern. The micropores (or nanopores) may be arranged in a periodic array, and may be spaced at a distance in the range of about 50 microns to about 200 microns.

The micropores may be produced by any appropriate method. According to one implementation, micropores with a diameter below 100 μm may be fabricated by plasma dry etching. In another implementation, micropores with a size above 100 μm may be fabricated by ultrasonic machining or laser drilling. According to another implementation, micropores with a diameter in the range of 1-100 μm may be produced by any appropriate silicon-based microfabrication technique. Using a silicon-based fabrication technique, micropores can be fabricated as nanopores as small as 450 nm in diameter. In one implementation, microfabrication of pores 450 nm to 100 μm is done in a cleanroom process while for pore sizes above 100 μm, micromachining such as lasers or micro drilling of laminated sheets is utilized.

The ion-selective material may be deposited on to a substrate by any suitable deposition process. In one implementation, a thin layer of an ion-selective material may be deposited on the inside wall of a pore. According to one implementation, the ion-selective material is deposited as a layer with a thickness in the range of about 200 nm up to about 3 μm. The thickness of the ion-selective layer may be impacted by the size of the micropores. A spin coat process may be utilized to deposit a PEDOT-PSS or Nafion resin as the ion-selective material. A spin coat process may result in excess ion-selective material on a top and/or bottom surface of the substrate. Any suitable process may be utilized to remove the excessive ion-selective material on the top and/or bottom surface after spin coating. According to one implementation, reactive ion etching (RIE) may be utilized to remove excess ion-selective material. After removal of the excess ion-selective material, the ion-selective material may be present only on the interior surfaces of the micropores. A vacuum-assisted suction can be applied across the holes before drying out the ion-selective material to make sure that the holes are free. Conductive layers may then be deposited directly on top and bottom of the substrate containing the pores to form electrodes. According to one implementation, the conductive layers may be conductive metal layers that are deposited by an electron-beam deposition, sputtering or thermal evaporation process. In another implementation, the conductive layers may be conductive polymers that are deposited by a spin coating process. The conductive layers may have a thickness in the range of about 100 nm up to about 200 nm.

Figure 3:
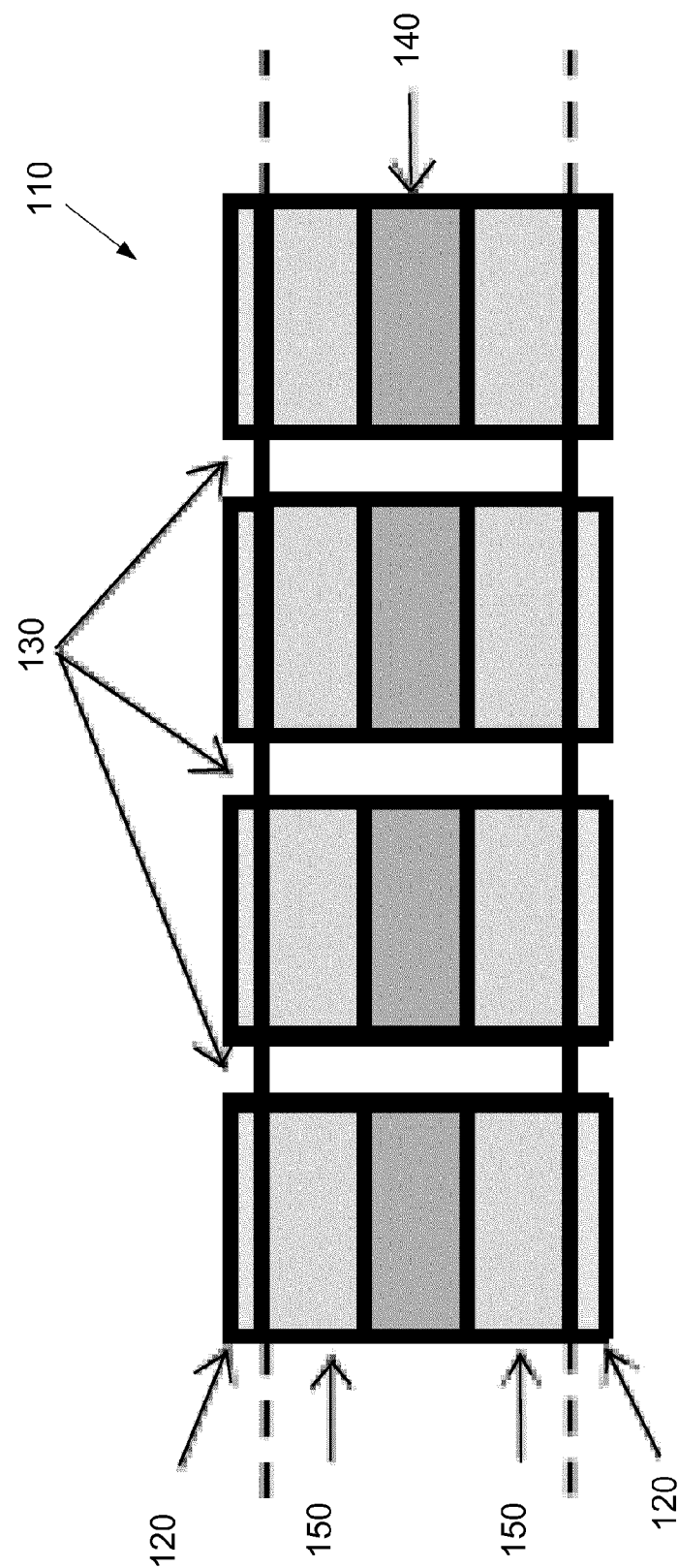
FIG. 3 is a schematic diagram illustrating the operation of a filtration membrane according to one embodiment.

In another implementation, a lamination process may be utilized to produce the filtration membrane 110. As shown in FIG. 3, a sheet of ion-selective material 140 may be laminated between two substrate films 150. In one implementation, a thin sheet of PSS-PEDOT or Nafion as an ion-selective material may be laminated between with two plastic films as the substrate films 150. The plastic films may have a thickness in the range of about 250 µm to about 750 µm. In one embodiment the thickness of the plastic films may be about 500 µm. A conductive layer 120 may be deposited on both sides of the laminated structure. The micropores may be formed by any suitable process. In one implementation, the micropores may be formed through the thickness of the entire laminated structure at once. The micropores may be formed by a micro-drilling or laser machining technique. A micromachining technique may be used to form the micropores, for example when the size of the membrane is larger than standard 12" wafers.

The conductive layers may be deposited by any suitable process. In one implementation, the conductive layers may be deposited utilizing a sputtering process. The conductive layers may be formed from any appropriate material, such as metals, alloys, doped materials, and mixtures thereof.

Figure 4:
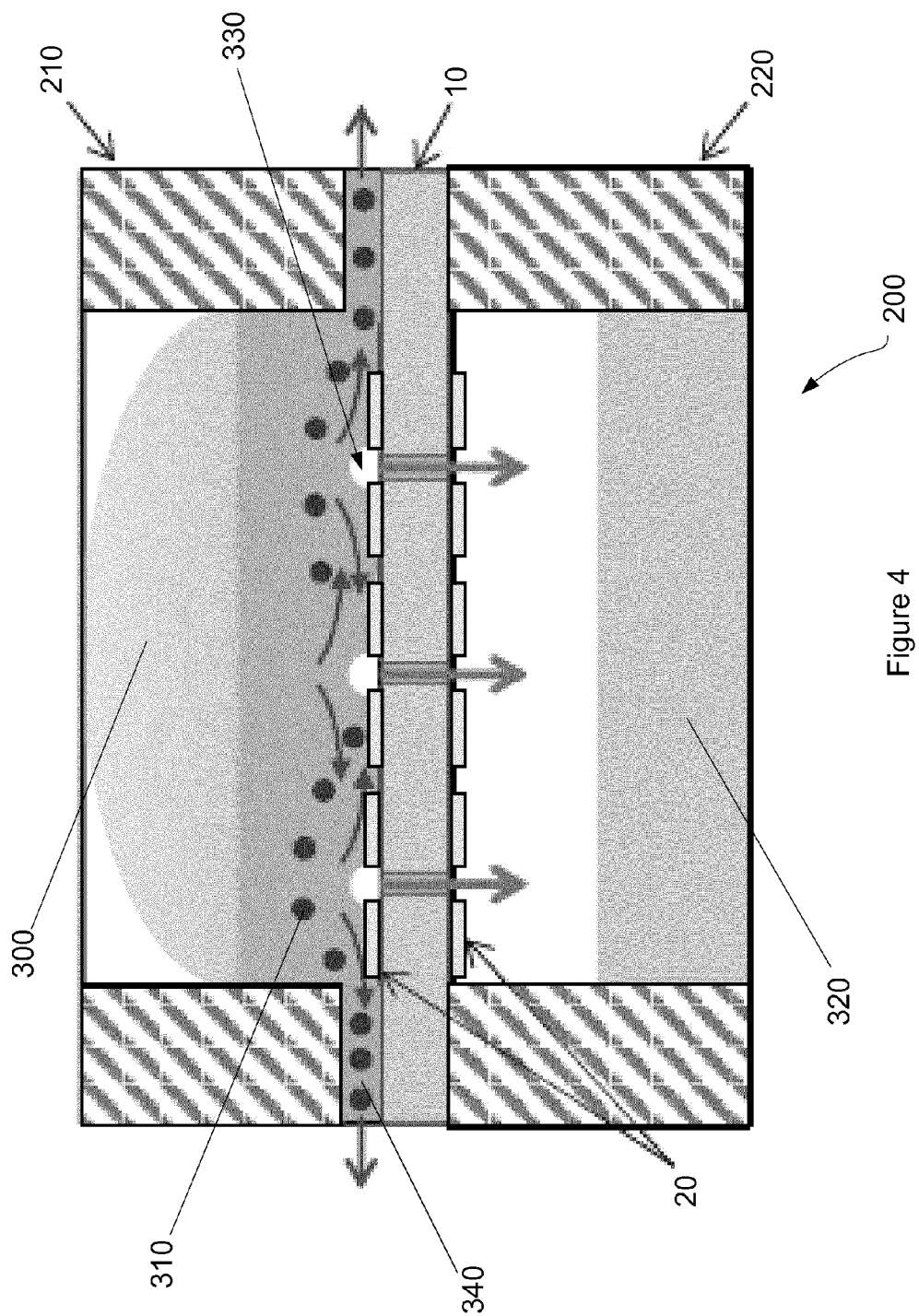
FIG. 4 is a schematic diagram illustrating the operation of a filtration system according to one embodiment.

A filtration apparatus may be provided that includes the filtration membrane. The filtration apparatus, an embodiment of which is shown in FIG. 4, may include a housing 200 having an upper portion 210 and a lower portion 220, with the filtration membrane located between the upper and lower housing portions. According to one implementation, the filtration membrane 10 is clamped between the upper portion 210 and lower portion 220 of the housing. The housing may additionally include an inlet for a contaminated fluid, an outlet for the filtered fluid, and an outlet for a concentrated contaminated fluid 340.

The filtration may be accomplished when a pressure-driven flow pushes the contaminated fluid through the micropores (or nanopores), as shown in FIG. 3. The ion-depletion region 330 formed when a voltage is applied across the filtration membrane prevents the charged ions and molecules from passing through the filtration membrane 10, while the filtered fluid 320 consisting of neutral molecules and ions flows through the pores. This produces a region of concentrated contaminated fluid above the filtration membrane. The concentrated charged molecules or ions (or contaminated fluid) may be collected from a dedicated outlet 340 of the housing as it accumulates throughout the filtration process. According to one implementation, the filtration is carried out as a continuous feed process.

The pressure-driven flow may be achieved by any suitable means. In one implementation, the filtration housing is configured such that gravity produces a pressure-driven flow in the contaminated fluid or mixtures of different molecules. According to another implementation, a pump or other pressure producing means may be utilized to produce the pressure-driven flow.

The filtration membrane exhibits several advantages over pre-existing reverse osmosis (RO) membrane filters for desalination. Firstly, the pore size of the membrane can be significantly higher than the nanopores of pre-existing RO membranes. In the case of the microfabricated nanopores in the $SiO_2$ layer, the pore surface is hydrophilic so that even at similar sizes (~450 nm) a fluid transport is much faster than in conventional ROI membranes. As a result, the filtration membrane is less prone to clogging and the throughput can be significantly higher than nanopore RO membranes. An additional advantage is that the fabrication of micropores is significantly easier and lower cost than that of nanopores.

The standard cleanroom microfabrication processes used in the production of the filtration membrane allows the creation of micropores with a precise geometry anywhere between 1 um and 250 um in a specific periodic arrangement. According to one implementation, the micropores may exhibit a uniform size with a standard deviation of ±0.5 um. As a result, the throughput of the filtration membrane is increased in comparison to pre-existing ROI filtration membranes. Microfabrication also allows the integration of the electrodes formed by the conductive layers directly on the membrane. The matching of the geometry of the conductive layers to the geometry of the micropores lowers the power consumption of the filtration membrane significantly in comparison to membranes that utilize wire mesh electrodes as separate entities without integration onto the membrane. Additionally, the design of the filter membrane is highly scalable, such that a large-scale filtration membrane may be produced. This scalability allows the filtration membrane to be deployed in a wide range of challenging water-related problems such as seawater desalination and water filtration or molecular separation. The mechanism for creating the membrane allows for creation of a membrane with a uniform thickness. The thickness variation of the membrane may be dependent on the thickness variation of a prefabricated wafer or sheet utilized in the microfabrication process. According to one embodiment, the membrane exhibits a thickness variation within about ±0.5 um. For embodiments described above provide for improved scalability as the precise control of the placement of the electrodes prevents placement issues experienced by prior art mesh electrode techniques. An application in isoelectric point (pI)-based protein separation is also possible by varying the pH value of a protein sample solution. The total cost of the filtration apparatus may be lowered significantly by employing an injection-molded plastic membrane substrate in which the ion-selective micropores may be integrated.

The filtration membrane may be used for sea water desalination. In comparison to pre-existing reverse osmosis membranes, this filtration membrane is less prone to clogging as a function of the larger pore size. In addition, the larger pore size allows more energy-efficient desalination than pre-existing RO membranes. Massive parallelization of micropores may produce a throughput of greater than about 1 L/min. In one implementation a throughput of about 1.4 L/min on a 150 mm×150 mm ion-selective filtration membrane (with a pore diameter of 200 µm at a spacing of 100 µm between each pore). The energy consumption of the filtration membrane may be less than about 14 Wh/L. In one implementation, the energy consumption may be about 13.4 Wh/L, based on a required voltage of 80V at 100 nA per micropore. Pre-existing gravity-driven household water purification systems have a throughput of about 200 mL/min, and a commercially available seawater desalination system using RO has a flow rate of about 262 mL/min and 11.8 L/min with a low energy efficiency of about 35-95 Wh/L. The filtration system can also be applied to general filtration of brackish water, such as in rural settings.

Another potential commercial application of the ion-selective filtration membrane is in the separation of proteins. The filtration membrane may be employed to continuously separate a proteomic sample via titration. At each specific pH value during titration, neutral or near neutral protein molecules with isoelectric point (pI) values corresponding to the pH value pass through the ion-selective filtration membrane and are collected. All other proteins with pI values greater than or less than the pH value may be collected from a side outlet. In this manner, a complex protein mixture can be fractionated into simpler pI (isoelectric point) fractions. These simpler pI fractions may be subjected to additional fractionation by repeating the fractionation process in order to increase purity or produce narrower pI fractions. Similarly, the ion-selective filtration membrane may be utilized to separate peptide mixtures on the basis of pI values. In some applications, the titration may be carried out by gradually decreasing the pH of the solution and filtering through the ion-selective filter membrane. According to another embodiment, the ion-selective filtration membrane may be utilized to sort, or remove, charged particles contained within a solution. In one embodiment, the ion-selective filtration membrane may be utilized to sort, or remove, bacteria contained in a solution.

EXAMPLES

Figure 5B:
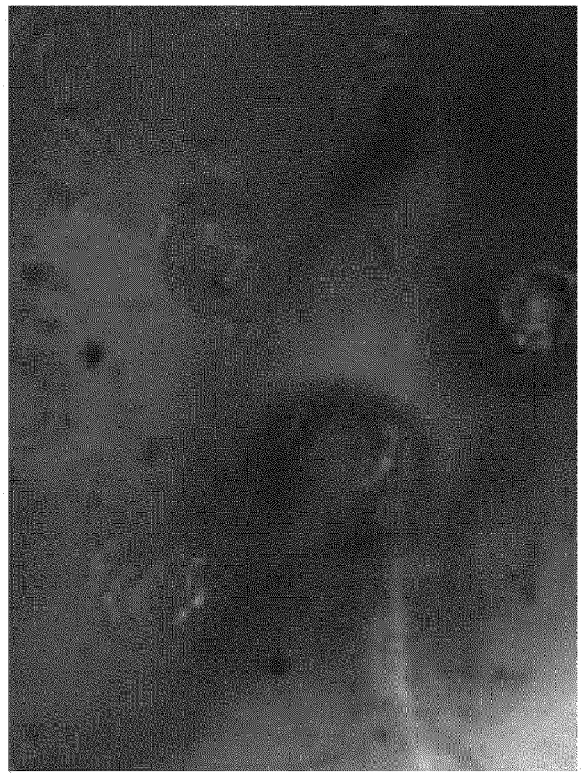
FIGS. 5A and 5B are depictions of a filtration membrane according to one embodiment, and the filtration membrane in the presence of dye, respectively.
Figure 5A:
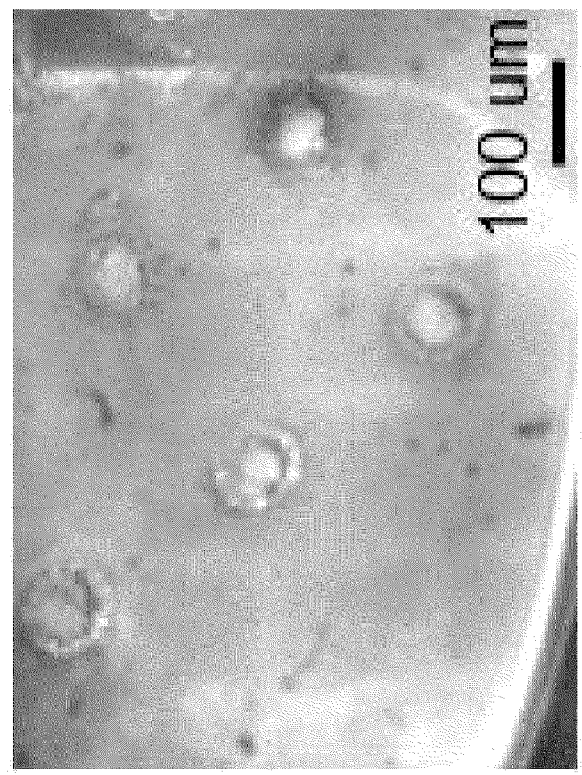
Figure 6:
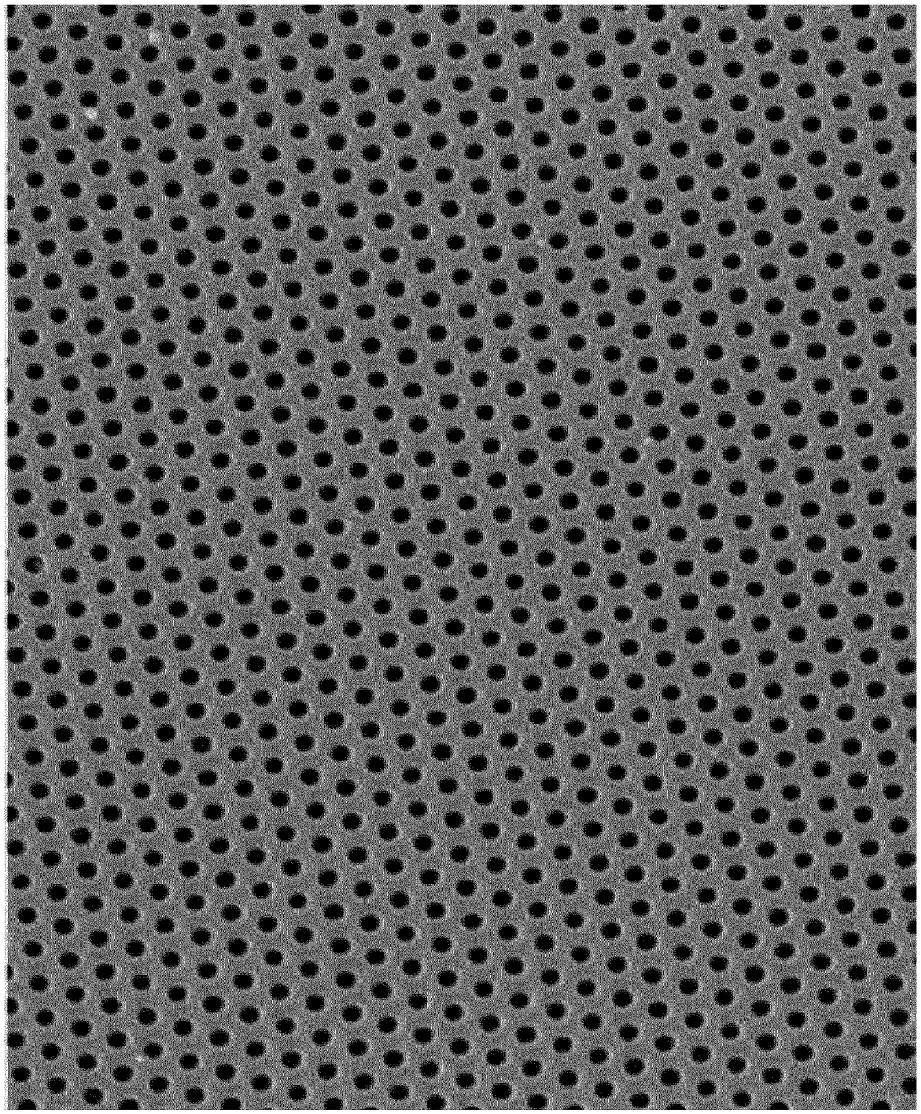
FIG. 6 illustrates nanopores in accordance with one implementation.

A Nafion sheet was perforated with a laser beam to fabricate micropores with a diameter of about 100 μm, as shown in FIG. 5B. Gold was sputtered on the surface as a conductive layer. An electric voltage of 1 V was applied across the membrane, and as a result a fluorescent FICT dye was removed from the membrane on the anodic side within 30 seconds as shown in FIG. 5B, demonstrating a repulsion of the charged dye molecules by the ion depletion force.

Figure 7B:
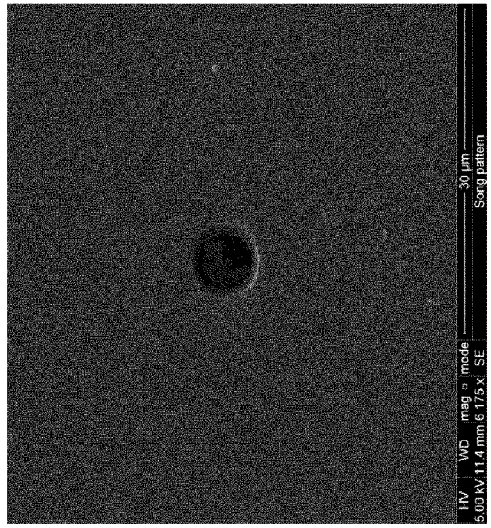
FIG. 7B illustrates a single 5 µm microhole.
Figure 7D:
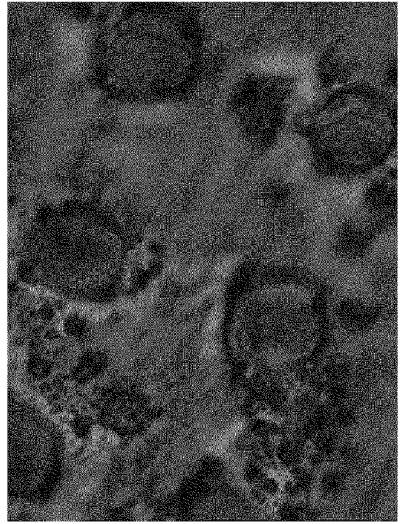
FIG. 7D illustrates a membrane with an array of 5 µm microholes in silicon after coating with PEDOT:PSS (backside).
Figure 7A:
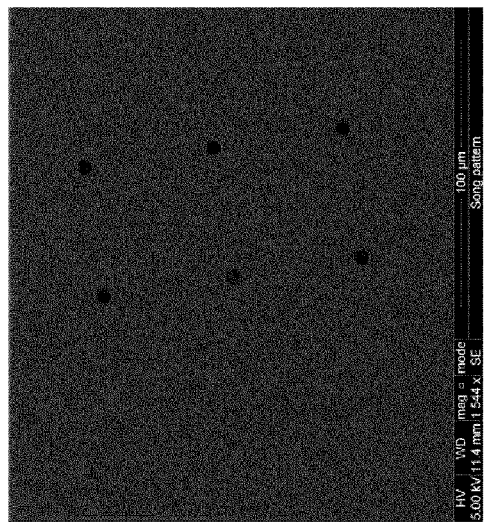
FIG. 7A illustrates a membrane with an array of 5 µm microholes in silicon.
Figure 7C:
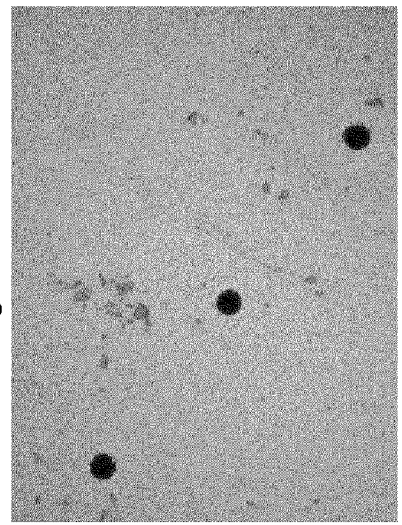
FIG. 7C illustrates the membrane with an array of 5 µm microholes in silicon after coating with PEDOT:OSS (front side)

FIG. 7A illustrates a membrane with an array of 5 μm microholes in silicon; FIG. 7B illustrates a single 5 μm microhole; FIG. 7C illustrates the membrane with an array of 5 μm microholes in silicon after coating with PEDOT: OSS (front side); FIG. 7D illustrates a membrane with an array of 5 μm microholes in silicon after coating with PEDOT:PSS (backside).

Figure 8A:
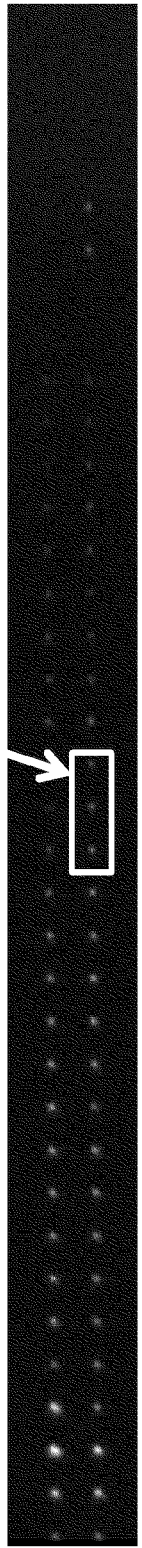
FIGS. 8A-B illustrate experimental results for one embodiment.
Figure 8B:
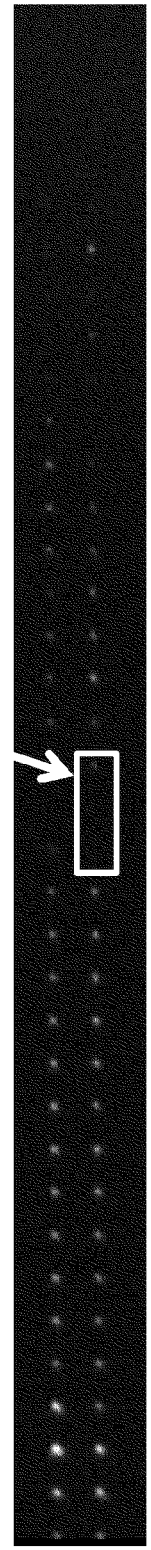

FIGS. 8A-B illustrate experimental results for one embodiment; FIG. 8A shows the microhole pattern voltage with florescent signaling; FIG. 8B shows the same microhole pattern but with voltage applied, showing no florescence signal in a portion where ion depletion has occurred. As seen in the Figure, the application of voltage to the membrane results in no fluorescence at several of the microholes. This corresponds to the ion depletion in this region.

Figure 9A:
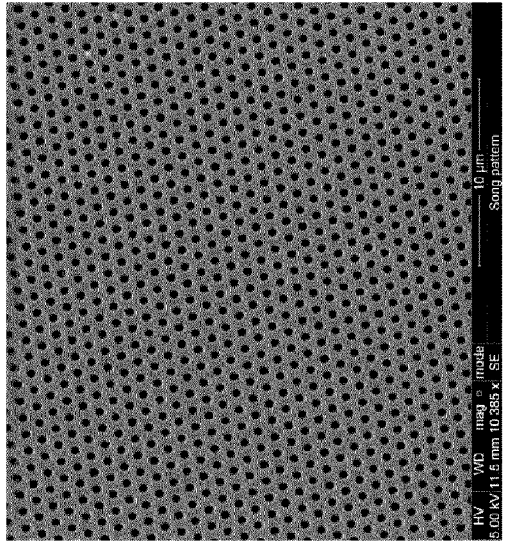
FIG. 9A-B show a silicon nitride membrane with an array of 450 nm nanopores.
Figure 9B:
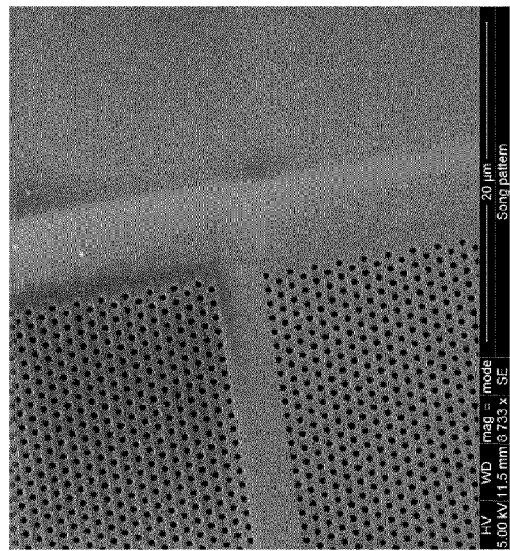

FIG. 9A-B show a silicon nitride membrane with an array of 450 nm nanopores.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A filtration membrane comprising:
a substrate disposed between at least a first conducting layer and a second conducting layer;
a plurality of pores extending through the first conductive layer, substrate, and second conductive layer, the plurality of pores selected from the group consisting of micropores, nanopores and combinations thereof, each of the plurality of pores having a pore sidewall comprised of the first conductive layer, the substrate, and the second conductive layer;
each of the plurality of pores having an ion-selective layer disposed on the pore sidewall; and
each of the first conductive layer and the second conductive layers configured to apply a voltage across the pores.

2. The membrane of claim 1, wherein the plurality of pores comprise micropores with a size in the range of about 1 micron to about 250 microns.

3. The membrane of claim 1, wherein the ion-selective layer in each of the plurality of pores is positioned nonparallel to the first conductive layer, the second conductive layer, and the substrate.

4. The membrane of claim 1, wherein the filtration membrane is a stacked structure including a first conductive layer, the substrate layer comprising a first substrate layer and a second substrate layer, and a second conductive layer, where the ion-selective layer of each of the plurality of pores is nonparallel with the first conductive layer and the first substrate layer;
such that the pores pass through each layer of the stacked structure.

5. The membrane of claim 1, wherein the substrate has a thickness in the range of about 250 microns to about 750 microns.

6. The membrane of claim 1, wherein each of the plurality of pores are distributed in a periodic array.

7. The membrane of claim 6, wherein each of the plurality of pores in the periodic array are spaced at a distance from each other of the plurality of pores in the range of about 50 microns to about 200 microns.

8. A filtration apparatus comprising:
a housing, and
a filtration membrane having a plurality of micropores, the filtration membrane comprising:
at least two conductive layers separated from each other by a substrate; and
each of the plurality of micropores having an ion-selective layer disposed on a sidewall and extending through the at least two conductive layers and the substrate,
wherein the at least two conductive layers are in communication with a voltage source and further wherein the filtration membrane is configured to apply a voltage across the micropores.

9. The apparatus according to claim 8, wherein the housing comprises:
an upper portion, and
a lower portion;
wherein the filtration membrane is disposed between the upper and lower portions of the housing.

10. The apparatus according to claim 8, wherein the housing comprises:
an inlet for a contaminated fluid,
an outlet for filtered fluid, and
an outlet for concentrated contaminated fluid.

11. The apparatus according to claim 8, wherein the apparatus has a flow throughput through the filtration membrane of at least about 1 mL/minute.

12. A microfabrication process for the production of a filtration membrane, comprising:
disposing an ion-selective layer on an interior surface of each of a plurality of pores of a substrate;

disposing a first conductive layer over a first side of the substrate, disposing a second conductive layer over a second side of the substrate;

wherein the filtration membrane comprises the first conductive layer, the substrate, and the second conductive layer with the plurality of pores extending therethrough and further wherein each of the plurality of pores has the ion-selective layer disposed therein on the interior surface.

13. The process of claim 12, wherein the pores are micropores.

14. The process of claim 12, wherein the pores are nanopores.

15. The process of claim 12, further comprising removing ion-selective material exterior of the plurality of pores.

16. The process of claim 12, wherein disposing the ion-selective layer comprises a spin-coating process.

17. The process of claim 16, wherein the micropores are formed by a micro-drilling or laser machining process.

18. The process of claim 16, wherein disposing the conductive layers comprises a sputtering process.

19. The process of claim 12, further comprising forming the plurality of micropores in the substrate.

20. A micromachining process for the production of a filtration membrane, comprising:

laminating an ion-selective layer between a first substrate and a second substrate, disposing a first conductive layer over a first side of the laminated structure, disposing a second conductive layer over a second side of the laminated structure, and forming a plurality of micropores, wherein each of the plurality of pores extends through all of the layers laminated structure and conductive layers.

* * * * *